(12) United States Patent
Meguro et al.

(10) Patent No.: US 7,800,686 B2
(45) Date of Patent: Sep. 21, 2010

(54) ELECTRONIC CAMERA HAVING A LIGHT REDUCTION DEVICE

(75) Inventors: Akihiko Meguro, Kawasaki (JP); Kazuya Umeyama, Edogawa-ku (JP)

(73) Assignee: Nikon Corporation, Tokyo (JP)

( * ) Notice: Subject to any disclaimer, the term of this patent is extended or adjusted under 35 U.S.C. 154(b) by 327 days.

(21) Appl. No.: 11/889,737

(22) Filed: Aug. 16, 2007

(65) Prior Publication Data

US 2008/0049122 A1 Feb. 28, 2008

(30) Foreign Application Priority Data

Aug. 22, 2006 (JP) ............... 2006-225384

(51) Int. Cl.
*H04N 5/225* (2006.01)
*H04N 5/235* (2006.01)
*H04N 5/238* (2006.01)

(52) U.S. Cl. ............... 348/361; 348/221.1; 348/230.1; 348/364

(58) Field of Classification Search ............. 348/220.1, 348/221.1, 229.1, 230.1, 360, 361, 362, 363, 348/364, 366
See application file for complete search history.

(56) References Cited

U.S. PATENT DOCUMENTS

| | | | | |
|---|---|---|---|---|
| 4,827,348 A * | 5/1989 | Ernest et al. | ............. | 348/221.1 |
| 5,331,368 A | 7/1994 | Oosawa et al. | | |
| 6,930,723 B1 * | 8/2005 | Tsuda et al. | ............. | 348/363 |
| 7,199,830 B1 * | 4/2007 | Tanaka et al. | ............. | 348/362 |
| 7,365,791 B2 * | 4/2008 | Ikeda | ............. | 348/363 |
| 7,450,170 B2 * | 11/2008 | Terai et al. | ............. | 348/342 |
| 7,557,857 B2 * | 7/2009 | Tsuda et al. | ............. | 348/360 |
| 2004/0046872 A1 * | 3/2004 | Udagawa | ............. | 348/221.1 |
| 2005/0046737 A1 * | 3/2005 | Terai et al. | ............. | 348/342 |
| 2005/0259177 A1 * | 11/2005 | Senoo | ............. | 348/362 |
| 2006/0192884 A1 * | 8/2006 | Tsuda | ............. | 348/342 |
| 2007/0120998 A1 * | 5/2007 | Ikeda | ............. | 348/362 |
| 2008/0024653 A1 * | 1/2008 | Ikeda | ............. | 348/362 |
| 2008/0024654 A1 * | 1/2008 | Shinohara | ............. | 348/362 |
| 2008/0068492 A1 * | 3/2008 | Ikeda | ............. | 348/363 |
| 2009/0073290 A1 * | 3/2009 | Umeyama | ............. | 348/248 |

FOREIGN PATENT DOCUMENTS

| | | |
|---|---|---|
| EP | 1 069 767 A2 | 1/2001 |
| EP | 1 389 006 A2 | 2/2004 |
| JP | A-5-288997 | 11/1993 |

(Continued)

OTHER PUBLICATIONS

Jun. 21, 2010 European Search Report issued in Application No. 07114562.7.

*Primary Examiner*—John M Villecco
(74) *Attorney, Agent, or Firm*—Oliff & Berridge, PLC

(57) ABSTRACT

An electronic camera includes: a luminance detection device that detects a luminance of a photographic field; an image sensor that captures an image of a photographic subject; a light reduction device that changes over between reducing an amount of light from the photographic subject that is conducted to the image sensor, and not performing such light amount reduction; and a calculation device that, when moving image photography is started with the image sensor, decides whether or not to perform the light amount reduction with the light reduction device according to the luminance detected by the luminance detection device, and then calculates a control exposure for this moving image photography.

10 Claims, 2 Drawing Sheets

FOREIGN PATENT DOCUMENTS

| | | | |
|---|---|---|---|
| JP | 2001078086 A | * | 3/2001 |
| JP | 2001145017 A | * | 5/2001 |
| JP | A 2003-114461 | | 4/2003 |
| JP | 2004289348 A | * | 10/2004 |
| JP | A-2004-333553 | | 11/2004 |
| JP | A-2005-156861 | | 6/2005 |

* cited by examiner

ELECTRONIC CAMERA HAVING A LIGHT REDUCTION DEVICE

INCORPORATION BY REFERENCE

The disclosure of the following priority application is herein incorporated by reference:
Japanese Patent Application No. 2006-225384, filed Aug. 22, 2007.

BACKGROUND OF THE INVENTION

1. Field of the Invention
The present invention relates to an electronic camera.
2. Description of Related Art
In Japanese Laid-Open Patent Publication 2003-114461, as a means for limiting the amount of incident light of a camera, there is disclosed a technique in which, instead of a small diameter aperture, an ND filter is employed. Normally, during photography of a moving image (video) with an electronic camera that is not equipped with any auto iris function like a video camera, but that is equipped with such an ND filter, exposure control is performed as follows. That is, a control exposure with fully open aperture (not using the ND filter) is calculated, and then, if the luminance of the photographic subject is high and the shutter speed arrives at its control extreme, the system changes over to a small diameter aperture (using the ND filter) and the control exposure is recalculated.

With this prior art technique, if, for example, in the outdoors, an area in the shade of a tree is included in the photographic subject, then there is a problem of the occurrence of smearing if a photographic subject of high luminance enters into the photographic field, since photography is being performed with fully open aperture (not using the ND filter) irrespective of the fact that this moving image photography is outdoors.

SUMMARY OF THE INVENTION

An electronic camera according to a first aspect of the present invention includes: a luminance detection device that detects a luminance of a photographic field; an image sensor that captures an image of a photographic subject; a light reduction device that changes over between reducing an amount of light from the photographic subject that is conducted to the image sensor, and not performing such light amount reduction; and a calculation device that, when moving image photography is started with the image sensor, decides whether or not to perform the light amount reduction with the light reduction device according to the luminance detected by the luminance detection device, and then calculates a control exposure for this moving image photography.

According to a 2nd aspect of the present invention, in the electronic camera according to the 1st aspect, it is preferable that the calculation device decides to perform the light amount reduction with the light reduction device, if the luminance detected by the luminance detection device is higher than a predetermined first threshold value; and that the light reduction device continues to perform the light amount reduction during the moving image photography.

According to a 3rd aspect of the present invention, in the electronic camera according to the 2nd aspect, the calculation device may calculate a control exposure so as to change an exposure time period while the image capture sensitivity is set to a predetermined value on a low sensitivity side within a control range of the image capture sensitivity.

According to a 4th aspect of the present invention, in the electronic camera according to the 3rd aspect, the calculation device may calculate a control exposure so as to increase the image capture sensitivity, if the luminance is insufficient even though the exposure time period is changed to a predetermined value on a low speed side within a control range of the exposure time period.

According to a 5th aspect of the present invention, in the electronic camera according to the 2nd aspect, the calculation device may calculate a control exposure so as to change the image capture sensitivity without changing the exposure time period, in a predetermined luminance range that includes the first threshold value.

According to a 6th aspect of the present invention, in the electronic camera according to the 1st aspect, it is preferable that the calculation device decides not to perform the light amount reduction with the light reduction device, if the luminance detected by the luminance detection device is not higher than a predetermined first threshold value; and that during the moving image photography, the light reduction device continues to perform the light amount reduction until the luminance detected by the luminance detection device becomes higher than a second threshold value that is brighter than the first threshold value.

According to a 7th aspect of the present invention, in the electronic camera according to the 6th aspect, it is preferable that the calculation device, during the moving image photography, decides to perform the light amount reduction with the light reduction device, when the luminance detected by the luminance detection device becomes brighter than the second threshold value; and that the light reduction device maintains a state of performing the light amount reduction during the moving image photography, when the calculation device has decided to perform the light amount reduction due to the luminance detected by the luminance detection device having become brighter than the second threshold value.

According to a 8th aspect of the present invention, in the electronic camera according to the 6th aspect, the calculation device may calculate a control exposure so as to change an exposure time period while the image capture sensitivity has been set to a predetermined value on a low sensitivity side within a control range of the image capture sensitivity.

According to a 9th aspect of the present invention, in the electronic camera according to the 8th aspect, if the luminance is insufficient even though the exposure time period is changed to a limit value on a low speed side within the control range of the exposure time period, the calculation device may calculate a control exposure so as to increase the image capture sensitivity.

According to a 10th aspect of the present invention, in the electronic camera according to the 1st aspect, the light reduction device may include a ND filter, and change over between reduction of the amount of light from the photographic subject and non-reduction of the amount of light by inserting the ND filter into an optical path of the light from the photographic subject and retracting the ND filter from that optical path.

DESCRIPTION OF THE PREFERRED EMBODIMENT

Figure 1:
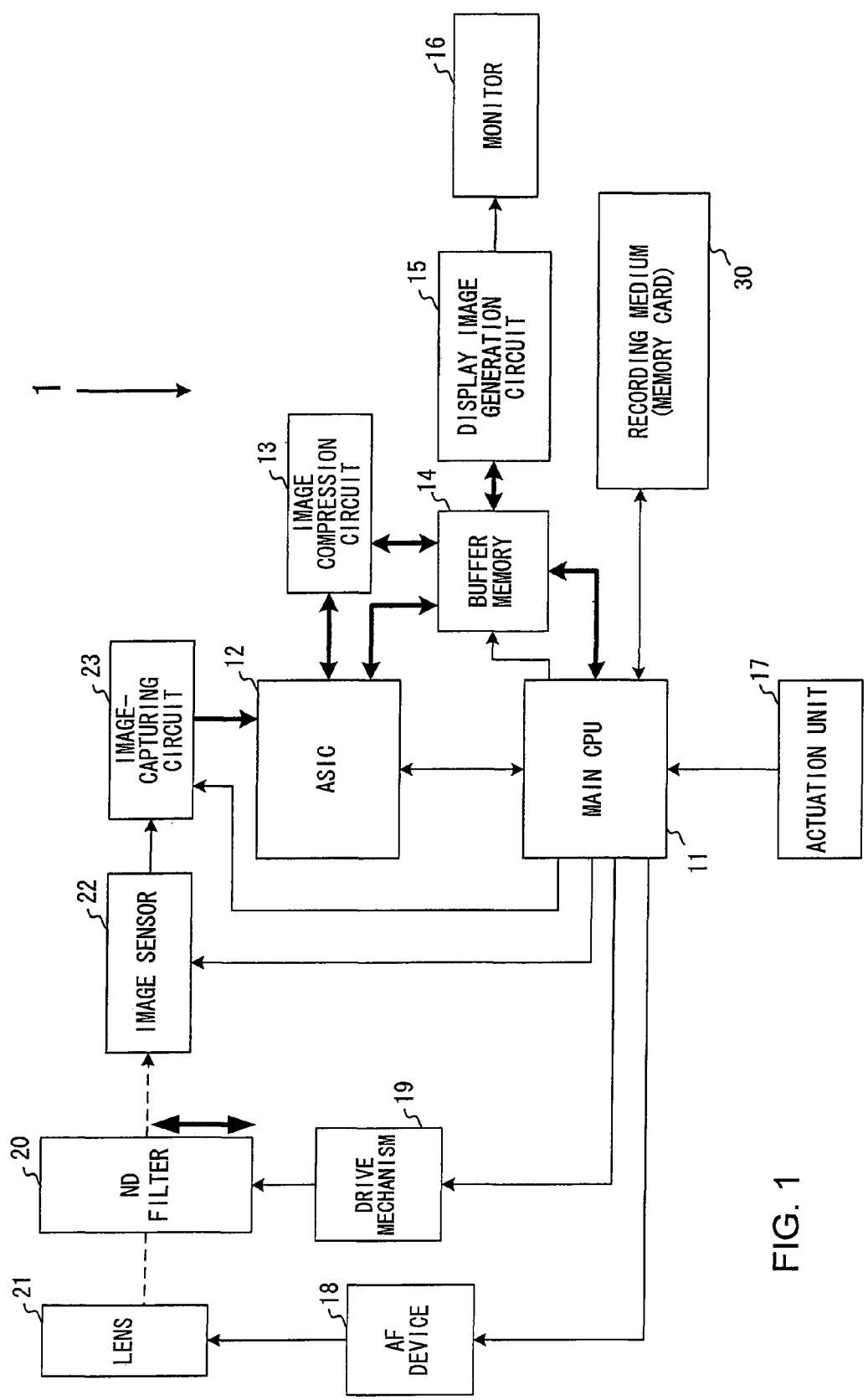
FIG. 1 is a block diagram of an electronic camera according to an embodiment of the present invention.

In the following, a preferred embodiment for implementation of the present invention will be explained with reference to the drawings. FIG. 1 is a block diagram for explanation of the structure of the main portions of an electronic camera according to an embodiment of the present invention. This electronic camera is controlled by a main CPU 11.

A photographic lens 21 forms an image of a photographic subject upon the image capture surface of an image sensor 22. This image sensor 22 may be structured as a CCD image sensor or the like, and it captures the image of the photographic subject thus formed upon its image capture surface and outputs a corresponding image capture signal to an image capture circuit 23. This image sensor 22 is capable of performing any one of single image capture of still image, successive image capture of a sequence of still images, and video image capture in which it captures a moving image.

An ND (Neutral Density) filter 20 is a light reduction member that attenuates the light transmitted through it by a predetermined amount (for example, equivalent to three steps in APEX value). This ND filter 20 is driven by a drive mechanism 19 in forwards and backwards directions orthogonally to the optical axis of the photographic lens 21. When the ND filter 20 is driven so as to be inserted into the optical path of the light from the photographic subject, then the amount of light that is incident upon the image sensor 22 is limited by the ND filter 20. On the other hand, when the ND filter 20 is driven so as to be retracted from the optical path of the light from the photographic subject, then the amount of light that is incident upon the image sensor 22 is not limited. The drive mechanism performs driving of the ND filter 20 forwards and backwards according to commands from the main CPU 11.

According to a command from the main CPU 11 for change of sensitivity, the image capture circuit 23 changes the image capture sensitivity (exposure sensitivity) in predetermined steps within a predetermined range (for example from a sensitivity corresponding to ISO 100 to a sensitivity corresponding to ISO 800). This image capture sensitivity is a controlled amount by which the sensitivity of detection of the electric charges accumulated by the image sensor 22, or the amplification gain of an amplification circuit not shown in the figures, is changed. The image capture sensitivity value is expressed as the corresponding ISO sensitivity value. Furthermore, according to a photographic command from the main CPU 11, the image capture circuit 23 converts the analog image capture signal to digital data using an internal A/D conversion circuit.

According to a command from the main CPU 11, an AF device 18 detects the state of focus adjustment of the photographic lens 21, and, according to the result of this detection, drives a focus lens, included in the structure of the photographic lens 21 but not shown in the figures, forwards and backwards along the direction of the optical axis.

The main CPU 11 inputs signals that are outputted from the various blocks shown in FIG. 1, performs predetermined calculations, and outputs control signals based upon the results of these calculations to the various blocks. An image processing circuit 12 includes, for example, an ASIC, and performs image processing upon the digital image signals inputted from the image capture circuit 23. This image processing may include, for example, contour accentuation and color temperature adjustment (white balance adjustment) processing, and also includes format conversion processing of the image signals.

An image compression circuit 13 performs image compression processing at a predetermined compression ratio by the JPEG method upon the image signals after they have been processed by the image processing circuit 12. And a display image generation circuit 15 generates display data for displaying the captured image upon a liquid crystal monitor 16.

A recording medium 30 is constituted of a memory card or the like that can be fitted to and removed from the electronic camera 1. According to a command from the main CPU 11, an image file including the data for a photographic image and information relating thereto is recorded upon this recording medium 30. And an image file that has thus been recorded upon the recording medium 30 may be read out according to a command from the main CPU 11.

A buffer memory 14, apart from temporarily storing data before and after image processing and during image processing, is also used for storing an image file before it is recorded upon the recording medium 30, and for storing an image file that has been read out from the recording medium 30.

An actuation section 17 includes various types of buttons and switches (actuation members) for control of this electronic camera 1, and outputs actuation signals to the main CPU 11, according to the details of actuation of the various actuation members such as depression actuation of a release button or a record button, changeover actuation of a function setting switch, and the like.

The above described electronic camera 1 is built so as to be capable of performing both still image photography and moving image (video) photography. Still image photography is photography that is performed according to an actuation signal (a photographic command) produced by full depression of the release button. And moving image photography is photography that is performed according to an actuation signal (a photographic command) produced by full depression of the record button.

—Still Image Photographic Operation—

When an actuation signal is inputted from the actuation section 17 indicating that the release button has been half pressed, the main CPU 11 starts photometry. In concrete terms, image capture for photometry is performed by the image sensor 22, and brightness information about the photographic field is acquired from the signal values of the image capture signal outputted after accumulation of electric charge. The main CPU 11 further performs exposure calculation based upon this brightness information, and thereby determines the conditions for exposure.

When, after this half press actuation signal, next an actuation signal is inputted from the actuation section 17 indicating that the release button has been full pressed, the main CPU 11 starts still image photographic operation. In concrete terms, it causes the image sensor 22 to perform electric charge accumulation for still photography with the exposure conditions determined as described above. And the image capture circuit 23 performs the above described signal processing upon the image capture signal outputted from the image sensor 22 after this electric charge accumulation for photography.

By the image processing circuit 12 outputting the image data, upon which signal processing has thus been performed, to the display image generation circuit 15, a still photographic image is displayed upon the liquid crystal monitor 16. Furthermore the image data, upon which compression processing has been performed by the image compression circuit 13, is recorded upon the recording medium 30.

—Moving Image Photographic Operation—

Moving image (video) photographic operation is a photographic operation in which recording upon the recording medium 30 is performed while the moving image that has been photographed by the image sensor 22 is being displayed upon the liquid crystal monitor 16. When the record button is full pressed and its actuation signal is inputted from the actuation section 17, the main CPU 11 performs this moving image photographic operation, and it continues to do so while this actuation signal that indicates that the record button is full pressed continues to be inputted.

When this actuation signal that indicates that the record button is half pressed is inputted from the actuation section 17, the main CPU 11 starts photometry. In concrete terms, image capture for photometry is performed by the image sensor 22, and brightness information about the photographic field is acquired from the signal values of the image capture signal outputted after accumulation of electric charge. The main CPU 11 further performs exposure calculation based upon this brightness information, and thereby determines the conditions for exposure.

When, after this half press actuation signal, next an actuation signal is inputted from the actuation section 17 indicating that the release button has been full pressed, the main CPU 11 starts moving image photographic operation. In concrete terms, it causes the image sensor 22 to perform electric charge accumulation for moving image photography with the exposure conditions determined as described above. Due to this, the image sensor 22 continuously outputs an image signal at a frame rate of, for example, 30 frames per second. And the main CPU 11 determines exposure conditions based upon the brightness information of the photographic field that are obtained from the signal values of this image capture signal that are sequentially outputted, and performs electric charge accumulation for the next frame with these exposure conditions.

The image signal that is outputted from the image sensor 22 in this manner, after having been subjected to predetermined processing by the image capture circuit 23 and the image processing circuit 12, along with being sequentially supplied to the liquid crystal monitor 16 via the display image generation circuit 15, is also recorded upon the recording medium 30 via the image compression circuit 13.

It should be understood that, if a command is issued by actuation of the actuation section 17 for recording upon the recording medium 30 in a non-compressed state, it is arranged to perform recording upon the recording medium 30 without the image compression circuit 13 performing compression processing.

Since the present invention is distinguished by its method of determining the exposure conditions during moving image photography, the explanation will concentrate upon that aspect. The main CPU 11 automatically determines the shutter speed, aperture value, and sensitivity according to the brightness of the photographic field, so as to approach closely to adequate exposure during moving image photography. The aperture value in the case of this embodiment is chosen alternatively from two values, by either inserting the ND filter 20 into the optical path or removing it therefrom. The shutter speed corresponds to the electric charge accumulation time period (the exposure time period) of the image sensor 22, and this electric charge accumulation time period of the image sensor 22 is controlled by a so called electronic shutter method.

Figure 2:
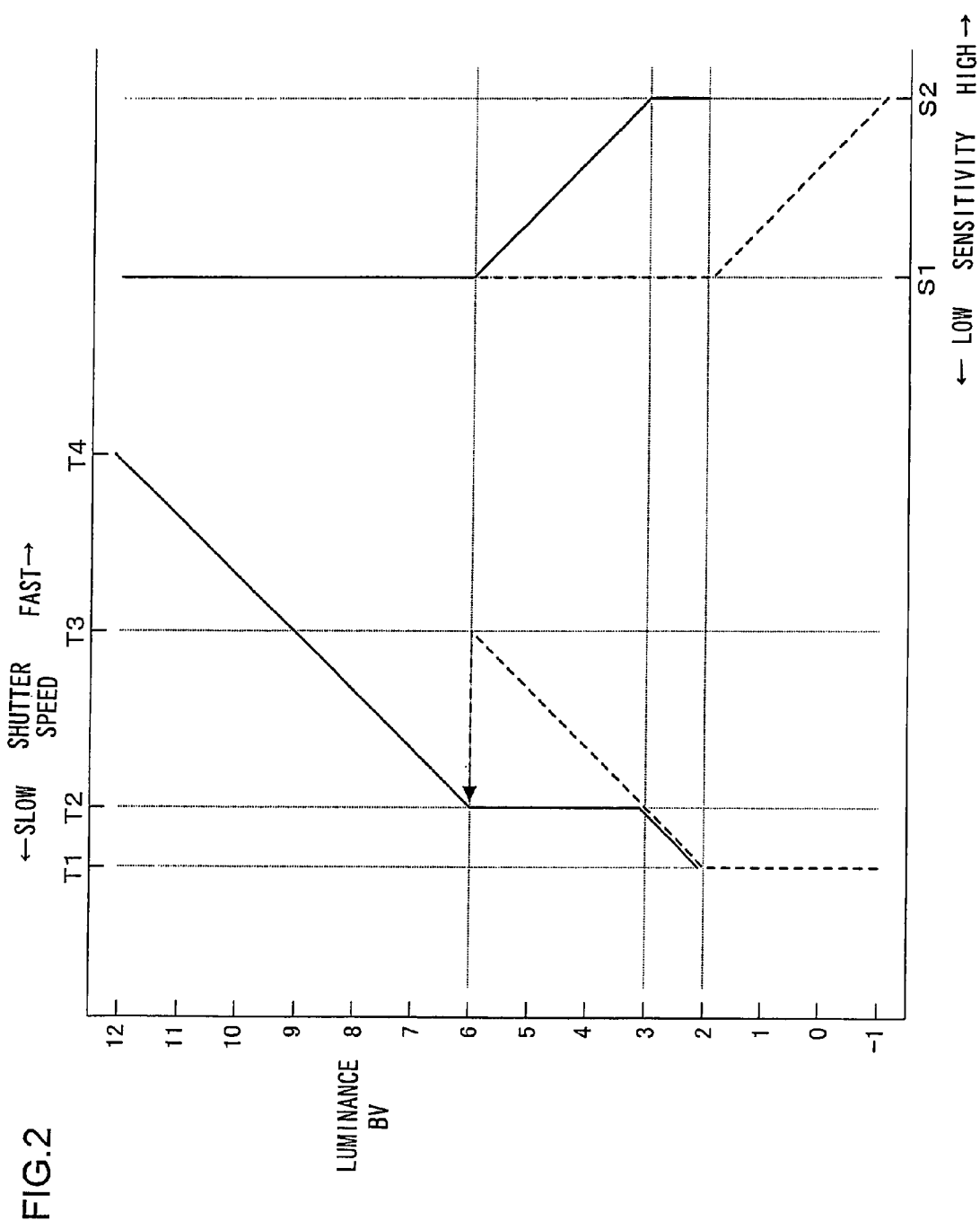
FIG. 2 is a figure showing an example of exposure control during moving image photography.

FIG. 2 is a figure showing an example of exposure control during photography of a moving image. In FIG. 2, the luminance BV of the photographic subject (i.e. the brightness of the photographic field) is shown upon the vertical axis, with higher luminance values being higher upon the axis and lower luminance values being lower. And the shutter speed that is determined is shown upon the upper horizontal axis, with higher speed values being more to the right upon the axis and lower speed values being more to the left. Moreover, the lower horizontal axis shows the image capture sensitivity that is determined, with higher sensitivity values being more to the right upon the axis and lower sensitivity values being more to the left.

—When it is Decided that Photography is Being Performed Outdoors—

Generally, when the luminance is greater than or equal to BV 4, the possibility that photography is being performed outdoors is high. Thus, if the result of the photometry in response to half press actuation of there cord button is greater than or equal to BV 4, the main CPU 11 issues a command to the drive mechanism 19, so as to shift the ND filter 20 into the optical path of the light from the photographic subject that is being conducted to the image sensor 22. Due to this, the amount of light that is incident upon the image sensor 22 is decreased by an amount equivalent to about three steps in APEX value, as compared to the case when the ND filter 20 is shifted away from the above described optical path (i.e. during fully open aperture).

The main CPU 11 further issues a command to the image capture circuit 23, and sets an initial value for image capture sensitivity. In this embodiment, the sensitivity initial value during moving image photography may be, for example, equivalent to S1 (corresponding to ISO 100). It is desirable to make this sensitivity initial value be a value on the low sensitivity side of the control range of image capture sensitivity (it may not be at the control limit). And the main CPU 11 calculates a shutter speed and an image capture sensitivity as described below, so as to obtain an adequate exposure in the above described state in which the ND filter 20 is inserted into the optical path (i.e. the reduced aperture state). Examples of this calculation are shown in FIG. 2 by the solid lines.

Luminance Range 1: $BV \geq 6$

The main CPU 11 fixes the image capture sensitivity to the above described initial value (S1) on the higher luminance side than the luminance of the photographic subject (in this example BV 6) corresponding to a predetermined value of shutter speed (that is a value programmed in advance, and in this example is a value T2 (1/30 sec) on the low speed side within the control range of shutter speed), and determines the control exposure by changing the shutter speed from T2 to its control limit value (in this example T4 (1/2000 sec)) on the high luminance side (as shutter speed, the high speed side).

Luminance Range 2: $6 > BV \geq 3$

The main CPU fixes the shutter speed to T2 in a predetermined range (in this example, between BV 6 and BV 3) on the lower luminance side than the luminance of the photographic subject corresponding to a predetermined value of shutter speed (T2 (1/30 sec)), and determines the control exposure by changing the image capture sensitivity from its initial value (S1) to its control range upper limit (in this example, S2) on the low luminance side (as image capture sensitivity, the high sensitivity side).

Luminance Range 3: $3 > BV \geq 2$

The main CPU 11 fixes the image capture sensitivity (to S2) on the lower luminance side than the luminance of the photographic subject (in this example, BV 3) corresponding to the predetermined value of shutter speed (T2 (1/30 sec)) and moreover to the control range upper limit (S2) on the low luminance side of image capture sensitivity, and determines the control exposure by changing the shutter speed from T2 to its control range lower limit (in this example, T1 (1/15 sec) that corresponds to the frame rate) on the low luminance side (as shutter speed, the low speed side).

And the main CPU 11 repeats the above calculation based upon the brightness information for the photographic field obtained from the signal value of the image capture signal for each frame that is sequentially outputted during moving image photography, and determines the control exposure during electric charge accumulation for the next frame. It should be understood that, if it has been decided at the start of moving image photography that this photography is being performed outdoors, then, during this moving image photography, the aperture is kept at reduced aperture and is not changed.

—When it is Decided that Photography is being Performed Indoors—

Generally, when the luminance is less than BV 4, the possibility that photography is being performed indoors is high. Thus, if the result of the photometry corresponding to half press actuation of the record button is less than BV 4, the main CPU 11 issues a command to the drive mechanism 19, so as to shift the ND filter 20 away from the optical path of the light from the photographic subject that is being conducted to the image sensor 22. Due to this, the amount of light that is incident upon the image sensor 22 is increased by an amount equivalent to about three steps in APEX value, as compared to the case when the ND filter 20 is shifted into the above described optical path (i.e. during reduced aperture).

The main CPU 11 further issues a command to the image capture circuit 23, and sets the image capture sensitivity to the above described initial value S1. And the main CPU 11 calculates a shutter speed and an image capture sensitivity as described below, so as to obtain an adequate exposure in the above described state in which the ND filter 20 is retracted from the optical path (i.e. the state of fully open aperture). Examples of this calculation are shown in FIG. 2 by the broken lines.

Luminance Range 1: $6 > BV \geq 2$

The main CPU 11 fixes the image capture sensitivity (S1) to the above described initial value (S1) in a predetermined range (from BV 2 to BV 6) on the higher luminance side than the luminance of the photographic subject (in this example BV 2) corresponding to the control range lower limit (in this example, T1 (1/15 sec) that is equivalent to the frame rate) on the low luminance side of shutter speed (as shutter speed, the low speed side), and determines the control exposure by changing the shutter speed from T1 to a predetermined value (in this example T3 (1/250 sec)) on the high luminance side (as shutter speed, the high speed side).

Luminance Range 2: $2 > BV \geq -1$

The main CPU fixes the shutter speed to T1 on the lower luminance side than the luminance of the photographic subject (BV 2) corresponding to the control range lower limit (T1 (1/15 sec)) on the low luminance side of shutter speed (as shutter speed, the low speed side), and determines the control exposure by changing the image capture sensitivity from its initial value (S1) to its control range upper limit (in this example, S2) on the low luminance side (as image capture sensitivity, the high sensitivity side).

Luminance Range 3: $BV \geq 6$

The main CPU 11 fixes the image capture sensitivity (to S1) on the higher luminance side than the luminance of the photographic subject (in this example, BV 6), and determines the control exposure by shifting the ND filter 20 into the optical path of the light from the photographic subject (i.e. by reducing the aperture) and by changing the shutter speed from T2 (1/30 sec) to its control range upper limit (in this example, T4 (1/2000 sec)) on the high luminance side (as shutter speed, the high speed side).

And the main CPU 11 repeats the above calculation based upon the brightness information for the photographic field obtained from the signal value of the image capture signal for each frame that is sequentially outputted during moving image photography, and determines the control exposure during electric charge accumulation for the next frame. It should be understood that, if after the start of moving image photography a change has been made from fully open aperture to reduced aperture, then during this moving image photography this reduced aperture state is maintained, and the control exposure is determined in a similar manner to the case when it has been decided that photography is being performed outdoors.

According to the embodiment described above, the following advantageous operational effects can be obtained.

(1) With this electronic camera, it is arranged first to decide to go over to reduced aperture if the brightness of the photographic field at the start of moving image photography is greater than or equal to a predetermined decision threshold value (BV 4), and subsequently to determine the control exposure during photography of the successive moving images. By thus reducing the aperture, it is possible to decrease the amount of light from the photographic subject that is conducted to the image sensor 22 as compared to the case in which the aperture is fully open, so that it is possible to suppress generation of the phenomenon of smearing.

Smearing is a phenomenon in which, when capturing an image of a photographic subject of extremely high luminance with a CCD image sensor, electric charge is created at a site on an electric charge transfer line that is adjacent to a picture element upon which the amount of incident light is great, this electric charge is transferred upon this electric charge transfer line, and the electric charge that is created as described above is integrated with respect to the electric charge accumulated by the picture elements other than the picture element upon which the amount of incident light is great. Since it becomes easy for such smearing to occur if the picture elements of the CCD image sensor are very small, or if the accumulation and transfer of electric charge are repeated, accordingly the calculation method for control exposure of this embodiment is particularly effective when performing photography of a moving image using a compact image sensor in which the number of picture elements is high.

It should be understood that although, in the embodiment described above, BV 4 is used as the predetermined decision threshold value, this is not to be considered as being limitative of the decision threshold value; in order to decide whether or not photography is being performed outdoors, any appropriate threshold value that is set in advance may be employed.

(2) Since the above described decision threshold value in order to make the decision as to whether to fix upon aperture reduction (in other words, whether photography is being performed outdoors or indoors) is set to BV 4, accordingly it is possible to fix to aperture reduction even when performing photography outdoors in the shade of a tree, or the like. Due to this, it becomes difficult for the smearing phenomenon to take place, even when during moving image photography the electronic camera 1 is directed to the outside of the tree shadow.

(3) Since, after having once fixed upon aperture reduction, the state of aperture reduction is maintained during this episode of moving image photography, accordingly it is possible to prevent the generation of mechanical noise by the drive mechanism 19 during moving image photography.

(4) When aperture reduction has been fixed upon, in the predetermined luminance range (from BV 3 to BV 6) that includes the above described decision threshold value (BV 4), it is arranged to determine the control exposure by changing the image capture sensitivity. In other words, if during photography of a moving image in the reduced aperture state the brightness of the photographic field has decreased below BV 6, it is arranged to fix the shutter speed to T2 that is a higher speed than the control range lower limit (T1) of shutter speed on the low luminance side, and to determine the control exposure by changing the image capture sensitivity from its initial value (S1) to the control range upper limit (S2) on the low luminance side. By doing this, it is possible to suppress blurring of the photographic subject, as compared with the case in which the shutter speed is fixed at T1.

(5) With this electronic camera 1, if the brightness of the photographic field when starting moving image photography is less than the above described decision threshold value (BV 4), then it is arranged initially to set the aperture to fully open, and subsequently to determine the control exposure during photography of the moving image. By setting the aperture to fully open, the amount of light from the photographic subject that is conducted to the image sensor 22 is increased as compared to the case in which the aperture is reduced, and a control exposure is obtained that is suitable for photography indoors, in which the brightness is insufficient as compared to the outdoors.

(6) If the photographic field has become dark during moving image photography in the fully open aperture state, then it is arranged to fix the shutter speed to T1 on the lower luminance side than BV 2, and to determine the control exposure by changing the image capture sensitivity from its initial value (S1) to its control range upper limit (S2) on the low luminance side. By doing this, it is possible to suppress noise superimposed upon the image capture signal, as compared with the case in which the shutter speed is changed with the image capture sensitivity just kept fixed at S2.

(7) If the brightness of the photographic field has become brighter than BV 6 during moving image photography in the fully open aperture state, then it is arranged to fix the image capture sensitivity at S1, and to determine the control exposure, having changed from fully opened aperture to reduced aperture, by changing the shutter speed from T2 to its control limit value (T4) on the high luminance side. By doing this, it becomes difficult for the phenomenon of smearing to take place, even if during photography of a moving image the electronic camera has been pointed to outdoors.

(8) If due to (7) above a change has been performed from fully open aperture to reduced aperture after photography of a moving image has started, then, since the reduced aperture state is maintained during this episode of moving image photography, accordingly, during photography of this moving image, it is possible to suppress the generation of mechanical noise due to the drive mechanism 19 to the minimum.

As has been explained above, with the electronic camera according to this embodiment of the present invention, during moving image photography in the outdoors, it is possible to reduce the amount of light from the photographic subject in an appropriate manner.

Although, in the explanation described above, it is arranged to acquire the brightness information for the photographic field by using the image capture signal from the image sensor 22, it would also be acceptable to arrange to provide a structure in which a sensor for photometry is provided that is separate from the image sensor 22, and in which the brightness information for the photographic field is acquired by using the output of this sensor. Furthermore, in the embodiment described above, an example was explained of application of the above described calculation method for control exposure to an electronic camera that is capable of capturing both still images and moving images (i.e. video). However, this should not be considered as being limitative of the present invention: it would also be possible to apply this method of calculating the control exposure according to this embodiment to a digital video camera that is only capable of performing moving image photography.

The above described embodiments are examples; various modifications can be made without departing from the scope of the invention.

What is claimed is:

1. An electronic camera, comprising:
a luminance detection device that detects a luminance of a photographic field;
an image sensor that captures an image of a photographic subject;
a light reduction device that changes over between reducing an amount of light from the photographic subject that is conducted to the image sensor, and not performing such light amount reduction; and
a calculation device that, when moving image photography is started with the image sensor, decides whether or not to perform the light amount reduction with the light reduction device according to the luminance detected by the luminance detection device, and then calculates a control exposure for this moving image photography, wherein:
the calculation device decides to perform the light amount reduction with the light reduction device, if the luminance detected by the luminance detection device is higher than a predetermined first threshold value; and
the light reduction device continues to perform the light amount reduction during the moving image photography, even if the luminance detected by the luminance detection device is lower than the predetermined first threshold value.

2. An electronic camera according to claim 1, wherein:
the light reduction device comprises a ND filter, and changes over between reduction of the amount of light from the photographic subject and non-reduction of the amount of light by inserting the ND filter into an optical path of the light from the photographic subject and retracting the ND filter from the optical path.

3. An electronic camera according to claim 1, wherein:
the calculation device calculates a control exposure so as to change an exposure time period while the image capture sensitivity is set to a predetermined value on a low sensitivity side within a control range of the image capture sensitivity.

4. An electronic camera according to claim 3, wherein:
the calculation device calculates a control exposure so as to increase the image capture sensitivity, if the luminance is insufficient even though the exposure time period is changed to a predetermined value on a low speed side within a control range of the exposure time period.

5. An electronic camera according to claim 1, wherein:
the calculation device calculates a control exposure so as to change the image capture sensitivity without changing the exposure time period, in a predetermined luminance range that includes the first threshold value.

6. An electronic camera, comprising:
a luminance detection device that detects a luminance of a photographic field;

an image sensor that captures an image of a photographic subject;

a light reduction device that changes over between reducting an amount of light from the photographic subject that is conducted to the image sensor, and not performing such light amount reduction; and a calculation device that, when moving image photography is started with the image sensor, decides whether or not to perform the light amount reduction with the light reduction device according to the luminance detected by the luminance detection device, and then calculates a control exposure for this moving image photography, wherein:

the calculation device decides not to perform the light amount reduction with the light reduction device, if the luminance detected by the luminance detection device is not higher than a predetermined first threshold value; and the light reduction device continues not to perform the light amount reduction during the moving image photography, even if the luminance detected by the luminance detection device is higher than the predetermined first threshold value.

7. An electronic camera according to claim 6, wherein:

the calculation device, during the moving image photography, decides to perform the light amount reduction with the light reduction device, when the luminance detected by the luminance detection device becomes brighter than a second threshold value that is higher than the first threshold value; and the light reduction device maintains a state of performing the light amount reduction during the moving image photography, when the calculation device has decided to perform the light amount reduction due to the luminance detected by the luminance detection device having become brighter than the second threshold value.

8. An electronic camera according to claim 6, wherein:

the calculation device calculates a control exposure so as to change an exposure time period while the image capture sensitivity has been set to a predetermined value on a low sensitivity side within a control range of the image capture sensitivity.

9. An electronic camera according to claim 8, wherein:

if the luminance is insufficient even though the exposure time period is changed to a limit value on a low speed side within the control range of the exposure time period, the calculation device calculates a control exposure so as to increase the image capture sensitivity.

10. An electronic camera according to claim 6 wherein:

the light reduction device comprises a ND filter, and changes over between reduction of the amount of light from the photographic subject and non-reduction of the amount of light by inserting the ND filter into an optical path of the light from the photographic subject and retracting the ND filter from that optical path.

\* \* \* \* \*